(12) United States Patent
Cooper et al.

(10) Patent No.: US 9,625,024 B2
(45) Date of Patent: Apr. 18, 2017

(54) DIFFERENTIAL WITH TORQUE COUPLING

(71) Applicant: Dana Automotive Systems Group, LLC, Maumee, OH (US)

(72) Inventors: Kenneth E. Cooper, Toledo, OH (US); Seth A. Metzger, Maumee, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/301,738

(22) Filed: Jun. 11, 2014

(65) Prior Publication Data

US 2014/0371020 A1 Dec. 18, 2014

Related U.S. Application Data

(60) Provisional application No. 61/834,945, filed on Jun. 14, 2013.

(51) Int. Cl.
| | |
|---|---|
| *F16H 48/22* | (2006.01) |
| *F16H 48/20* | (2012.01) |
| *F16D 13/04* | (2006.01) |
| *F16D 13/28* | (2006.01) |
| *F16D 13/52* | (2006.01) |
| *F16D 23/12* | (2006.01) |

(52) U.S. Cl.
CPC ............ *F16H 48/20* (2013.01); *F16D 13/04* (2013.01); *F16D 13/28* (2013.01); *F16D 13/52* (2013.01); *F16H 48/22* (2013.01); *F16D 2023/123* (2013.01)

(58) Field of Classification Search
None
See application file for complete search history.

(56) References Cited

U.S. PATENT DOCUMENTS

| | | |
|---|---|---|
| 4,805,486 A | 2/1989 | Hagiwara et al. |
| 4,895,236 A | 1/1990 | Sakakibara et al. |

(Continued)

FOREIGN PATENT DOCUMENTS

| | | |
|---|---|---|
| JP | 2004068878 A | 3/2004 |
| JP | 2010260383 A | 11/2010 |

OTHER PUBLICATIONS

Machine-generated English Translation of JP2004068878A, obtained via Espacenet Patent Search (URL: http://worldwide.espacenet.com/?locale=en_EP).

(Continued)

*Primary Examiner* — Erin D Bishop
(74) *Attorney, Agent, or Firm* — Marshall & Melhorn, LLC

(57) ABSTRACT

A torque coupling unit for use with a differential assembly is provided. The torque coupling unit comprises a first member, a second member, a clutching assembly, and a clutch actuator. The first member is in driving engagement with a side gear of the differential assembly. The second member is in driving engagement with an output shaft. The clutch actuator assembly is disposed adjacent the clutching assembly and comprises a roller and ramp assembly. In response to a rotation of a portion of the clutch actuator assembly a portion of the roller and ramp assembly is driven in an axial manner to apply a force to the clutching assembly, causing a first portion of the clutching assembly to be at least variably frictionally engaged with a second portion of the clutching assembly.

16 Claims, 3 Drawing Sheets

(56) References Cited

U.S. PATENT DOCUMENTS

| | | |
|---|---|---|
| 4,950,214 A | 8/1990 | Botterill |
| 4,955,853 A | 9/1990 | Bausch |
| 5,019,021 A | 5/1991 | Janson |
| 5,033,329 A | 7/1991 | Tezuka |
| 5,080,640 A | 1/1992 | Botterill |
| 5,092,825 A | 3/1992 | Goscenski, Jr. et al. |
| 5,106,349 A | 4/1992 | Botterill et al. |
| 5,279,401 A | 1/1994 | Stall |
| 5,911,643 A | 6/1999 | Godlew et al. |
| 5,966,999 A | 10/1999 | Showalter et al. |
| 6,398,686 B1 | 6/2002 | Irwin |
| 6,460,677 B1 | 10/2002 | Roscoe |
| 6,478,708 B2 | 11/2002 | Krisher |
| 6,537,172 B1 | 3/2003 | McAuliffe, Jr. et al. |
| 6,561,939 B1 | 5/2003 | Knapke |
| 6,719,662 B2 | 4/2004 | Forrest et al. |
| 6,742,640 B1 | 6/2004 | Grogg et al. |
| 6,742,642 B1 * | 6/2004 | Stevenson ............... F16D 13/04 192/54.52 |
| 6,755,763 B1 | 6/2004 | Goto et al. |
| 6,790,154 B1 | 9/2004 | Kelley, Jr. |
| 6,805,653 B2 | 10/2004 | Krzesicki et al. |
| 6,945,374 B2 | 9/2005 | Puiu |
| 6,945,375 B2 | 9/2005 | Kirkwood et al. |
| 6,948,604 B2 | 9/2005 | Puiu |
| 6,959,799 B2 | 11/2005 | Fusegi et al. |
| 6,971,494 B2 | 12/2005 | Puiu |
| 6,991,079 B2 | 1/2006 | Puiu |
| 6,991,080 B2 | 1/2006 | Puiu |
| 6,997,299 B2 | 2/2006 | Brissenden et al. |
| 7,004,873 B2 | 2/2006 | Puiu |
| 7,021,445 B2 | 4/2006 | Brissenden et al. |
| 7,044,880 B2 | 5/2006 | Bowen |
| 7,059,462 B2 | 6/2006 | Brissenden et al. |
| 7,059,992 B1 | 6/2006 | Bowen |
| 7,175,557 B2 | 2/2007 | Kirkwood et al. |
| 7,201,264 B2 | 4/2007 | Puiu |
| 7,201,266 B2 | 4/2007 | Brissenden et al. |
| 7,278,943 B2 | 10/2007 | Puiu |
| 7,294,086 B2 | 11/2007 | Brissenden et al. |
| 7,337,886 B2 | 3/2008 | Puiu |
| 7,338,403 B2 | 3/2008 | Puiu |
| 7,344,469 B2 | 3/2008 | Sharma et al. |
| 7,357,748 B2 | 4/2008 | Kelley, Jr. |
| 7,445,581 B2 | 11/2008 | Cring |
| 7,452,299 B2 | 11/2008 | Teraoka |
| 7,491,146 B2 | 2/2009 | Sharma et al. |
| 7,503,416 B2 | 3/2009 | Sharma et al. |
| 7,506,740 B2 | 3/2009 | Ronk et al. |
| 7,811,194 B2 | 10/2010 | Bowen |
| 7,887,450 B2 | 2/2011 | Fusegi et al. |
| 8,042,642 B2 | 10/2011 | Marsh et al. |
| 8,348,799 B2 | 1/2013 | Maruyama et al. |
| 8,388,486 B2 | 3/2013 | Ekonen et al. |
| 2011/0039652 A1 * | 2/2011 | Ekonen et al. ............... 475/220 |
| 2011/0143878 A1 | 6/2011 | Juenemann et al. |
| 2011/0308875 A1 | 12/2011 | Marsh et al. |
| 2011/0319213 A1 | 12/2011 | Ekonen et al. |
| 2012/0238388 A1 | 9/2012 | Fusegi et al. |
| 2013/0178321 A1 | 7/2013 | Ekonen et al. |
| 2013/0178323 A1 | 7/2013 | Ekonen et al. |
| 2013/0190126 A1 | 7/2013 | Bradford, Jr. |

OTHER PUBLICATIONS

Machine-generated English Translation of JP2010260383A, obtained via Espacenet Patent Search (URL: http://worldwide.espacenet.com/?locale=en_EP).

* cited by examiner

DIFFERENTIAL WITH TORQUE COUPLING

RELATED APPLICATION

The present application claims the benefit of U.S. Provisional Application No. 61/834,945 filed on Jun. 14, 2013, which is incorporated herein in its entirety by reference.

FIELD OF THE INVENTION

The present invention relates to differentials and associated torque coupling units for a motor vehicle, and more particularly to a rear wheel drive differential and torque coupling unit

BACKGROUND OF THE INVENTION

All-wheel drive vehicles may have a primary full time driveline and a secondary part time driveline, where the secondary driveline provides additional traction under vehicle acceleration or poor traction conditions. A torque coupling may be used in the secondary driveline to limit the torque flow from the primary driveline and to allow for differences in speed between the primary and secondary drivelines. When the secondary driveline is not providing additional traction it continues to rotate and energy is lost overcoming friction and spin loss (oil churning), both of which act to reduce fuel economy. To improve fuel economy, it is desirable to automatically disconnect the secondary driveline to eliminate energy losses.

It would be advantageous to develop a differential and torque coupling unit which may be selectively engaged to increase an efficiency of and to provide additional traction to a driveline the torque coupling unit is incorporated in.

SUMMARY OF THE INVENTION

Presently provided by the invention, a differential and torque coupling unit which may be selectively engaged to increase an efficiency of and to provide additional traction to a driveline the torque coupling unit is incorporated in, has surprisingly been discovered.

In one embodiment, the present invention is directed to a torque coupling unit for use with a differential assembly. The torque coupling unit comprises a first member, a second member, a clutching assembly, and a clutching actuator. The first member is in driving engagement with a side gear of the differential assembly. The second member is in driving engagement with an output shaft. The clutching assembly comprising a first portion and a second portion; the first portion drivingly engaged with the first member and the second portion drivingly engaged with the second member. The clutch actuator assembly is disposed adjacent the clutching assembly. The clutch actuator assembly comprises a roller and ramp assembly. In response to a rotation of a portion of the clutch actuator assembly a portion of the roller and ramp assembly is driven in an axial manner to apply a force to the clutching assembly, causing the first portion of the clutching assembly to be at least variably frictionally engaged with the second portion of the clutching assembly.

In another embodiment, the present invention is directed to a torque coupling unit for use with a differential assembly. The torque coupling unit comprises a clutch can, a clutch drum, a clutching assembly, and a clutching actuator. The clutch can is in driving engagement with a side gear of the differential assembly. The clutch drum is in driving engagement with an output shaft. The clutching assembly comprises a first plurality of plates and a second plurality of plates; the first plurality of plates drivingly engaged with the clutch can and the second plurality of plates drivingly engaged with the clutch drum. The clutch actuator assembly is disposed adjacent the clutching assembly. The clutch actuator assembly comprises an actuator, a gear set, and a roller and ramp assembly. The gear set is in driving engagement with the actuator and the roller and ramp assembly. In response to a rotation of a portion of the actuator a portion of the roller and ramp assembly is driven in an axial manner to apply a force to the clutching assembly, causing the first plurality of plates to be at least variably frictionally engaged with the second plurality of plates.

In yet another embodiment, the present invention is directed to a torque coupling unit for use with a differential assembly. The torque coupling unit comprises a clutch can, a clutch drum, a clutching assembly, a clutch actuator, a first bearing, and a second bearing. The clutch can is in driving engagement with a side gear of the differential assembly. The clutch drum is in driving engagement with an output shaft. The clutching assembly comprises a first plurality of plates and a second plurality of plates; the first plurality of plates drivingly engaged with the clutch can and the second plurality of plates drivingly engaged with the clutch drum. The clutch actuator assembly is disposed adjacent the clutching assembly. The clutch actuator assembly comprises an actuator, a gear set, and a roller and ramp assembly. The gear set is in driving engagement with the actuator and the roller and ramp assembly. The first bearing is disposed between the clutch can and the clutch drum. The second bearing is disposed between the clutching assembly and the roller and ramp assembly. In response to a rotation of a portion of the actuator a portion of the roller and ramp assembly is driven in an axial manner to apply a force to the clutching assembly through the second bearing while permitting relative rotation between the roller and ramp assembly and the clutching assembly, causing the first plurality of plates to be at least variably frictionally engaged with the second plurality of plates.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 1:
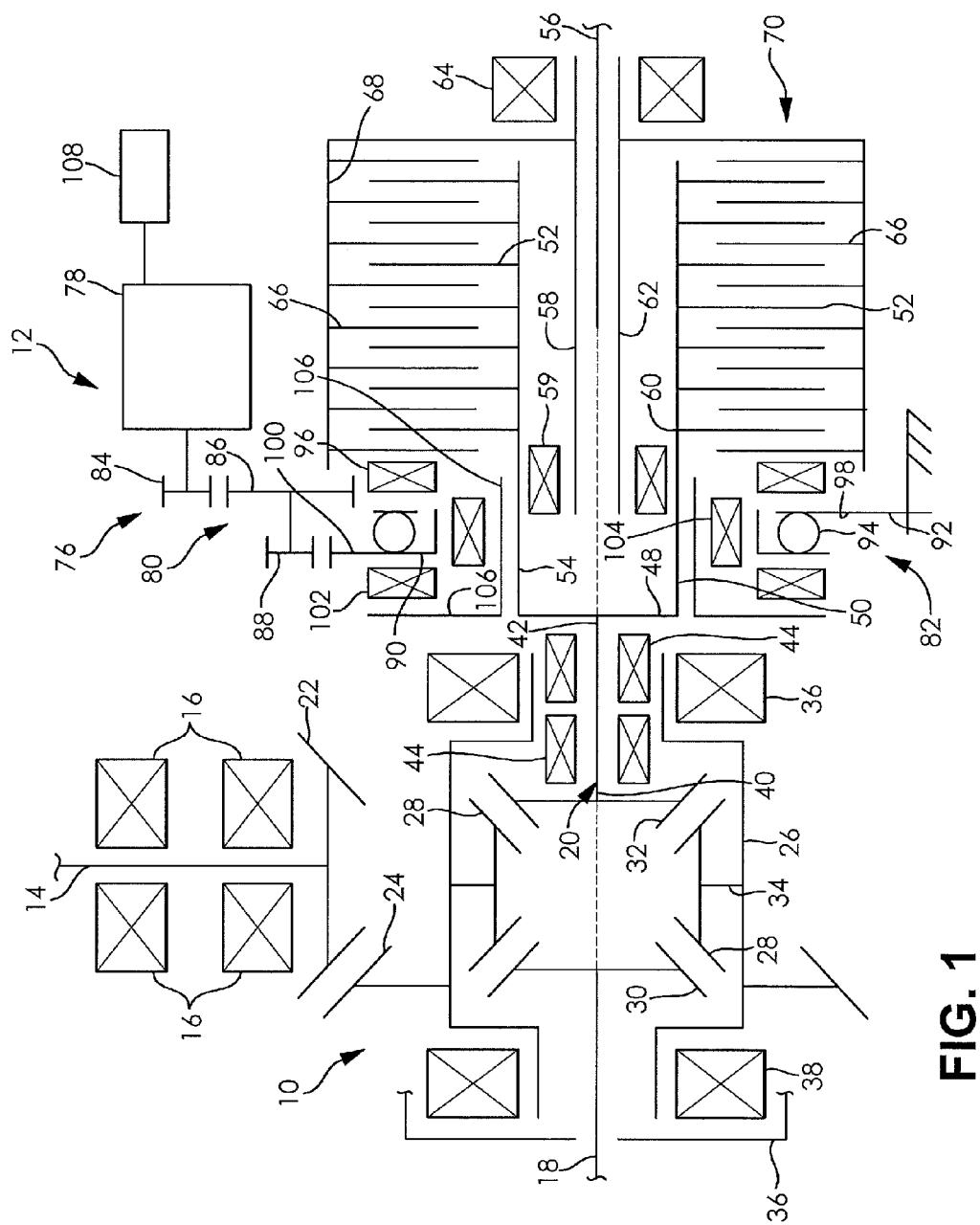
FIG. 1 is a schematic view of one embodiment of a differential and a torque coupling unit.

FIG. 1 illustrates a differential 10 and a torque coupling unit 12. The differential 10 is in driving engagement with a pinion shaft 14. The pinion shaft 14 is rotatably mounted in bearings 16 and is drivingly engaged with a source of rotational power, such as, but not limited to, an internal combustion engine. The differential 10 and the torque coupling unit 12 are respectively drivingly engaged with a first output shaft 18 and an intermediate shaft 20.

The pinion shaft 14 includes a pinion gear 22 mounted thereon that rotates with the pinion shaft 14. The pinion gear 22 is meshed with a ring gear 24 of the differential 10. The pinion gear 22 has a first set of teeth (not shown) and the ring gear 24 has a second set of teeth (not shown). The two sets of teeth are complimentary to one another and are meshed with one another to provide rotational drive from the pinion gear 22 to the ring gear 24.

The differential 10 includes the ring gear 24, a differential case 26, a set of pinion gears 28, and a set of side gears 30, 32. The ring gear 24 is drivingly engaged with the differential case 26; further, it is understood that the ring gear 24 may be integrally formed with the differential case 26, or it may be secured thereto with a plurality of fasteners. It can be appreciated that the connection of the ring gear 24 and the differential case 26 results in rotation of the differential case 22 when the ring gear 24 is driven by the pinion gear 18.

The differential case 26 houses the set of differential pinion gears 28, which are rotatably supported on a spider shaft 34 secured to the differential case 26. More particularly, the set of differential pinion gears 28 are located opposite one another on the spider shaft 34; however, it is understood that the set of differential pinion gears 28 may have other arrangements. The differential pinion gears 28 engage the set of side gears 30, 32. The set of side gears 30, 32 comprise a first side gear 30 and a second side gears 32 adapted to rotate about an axis coincident with an axis of the shafts 18, 20. The differential case 26 is mounted for rotation within a differential housing 36 (partially illustrated). The differential case 26 is mounted on bearings 38 to facilitate rotation within the differential housing 36.

The first output shaft 18 and the intermediate shaft 20 are shown in FIG. 1 extending from the first side gear 30 and the second side gears 32, respectively. The intermediate shaft 20 has a first end portion 40 and a second end portion 42. The first end portion 40 has a set of splines (not shown) on an exterior surface (not shown) that fit within a central aperture (not shown) of the first side gear 30. The central aperture is defined by complimentary, internal splines (not shown). The first output shaft 18 thus turns with the first side gear 30. The intermediate shaft 20 is mounted for rotation within the differential housing 36 on bearings 44, which may be conventional or roller bearings.

The second end portion 42 of the intermediate shaft 20 is connected to a clutch can 48. Thus, the clutch can 48 rotates with the intermediate shaft 20. The clutch can 48 and the intermediate shaft 20 may be integrally formed and unitary with one another or they may be separately formed. If separately formed, the intermediate shaft 20 may be connected to the clutch can 48 by a plurality of fasteners, splines, or the like.

In the depicted embodiment, the clutch can 48 is a hollow, cylindrically shaped member. An outer surface 50 of the clutch can 48 has located thereon a first plurality of clutch plates 52 secured thereto. The first plurality of clutch plates 52 are attached to the clutch can 48 and cannot separate therefrom during operation, but the first plurality of clutch plates 52 are permitted to move axially along the outer surface 50 of the clutch can 48.

An interior 54 of the clutch can 48 houses a second output shaft 56 and a portion of a clutch drum 58. At least a portion of the clutch drum 58 is mounted for rotation within the clutch can 48 on at least one clutch can bearing 59. More particularly, the clutch can bearing 59 is located between an internal surface 60 of the clutch can 48 and an inner surface 62 of the clutch drum 58. The clutch drum 58 is also mounted on a second bearing 64 located outboard from the clutch can bearing 59. The clutch can bearing 59 and the second bearing 64 facilitate rotation of the first clutch drum 58. The second output shaft 56 has a set of splines (not shown) on an exterior surface (not shown) that fit within a central aperture (not shown) of the clutch drum 58. The central aperture is defined by complimentary, internal splines (not shown). The second output shaft 56 thus turns with the clutch drum 58.

The clutch drum 58 is a hollow, cylindrically shaped member. The clutch drum 58 is drivingly engaged with the second output shaft 56 as described hereinabove. The clutch drum 58 houses a second plurality of clutch plates 66 that are located on an internal surface 68 of the clutch drum 58. The second plurality of clutch plates 66 are secured to the internal surface 68. The second plurality of clutch plates 66 are attached to the internal surface 68 and do not separate therefrom during operation, but the second plurality of clutch plates 66 are permitted to move axially along the internal surface 68. The second plurality of clutch plates 66 are interleaved with the first plurality of clutch plates 52. Together, the interleaved clutch plates 52, 66 form a clutch pack 70.

A clutch actuator assembly 76 is located adjacent the clutch pack 70. The clutch actuator assembly 76 comprises an actuator 78, a gear set 80, and a roller and ramp assembly 82. The actuator 78 is in driving engagement with the gear set 80 and the gear set 80 is in driving engagement with the roller and ramp assembly 82.

The actuator 78 may be such as a reversible electric motor as it is compact and easily controllable. It will be appreciated that any other appropriate type of actuator may be used, such as hydraulic or pneumatic, and these are within the scope of the invention.

The actuator 78 drives the gear set 80, which may be a reduction set of gears. In the depicted embodiment, a first gear 84 of the actuator 78 drives a second gear 86 of the gear set 80. The second gear 86 drives a third gear 88 of the gear set 80. The gears 84, 86, 88 achieve a desired torque and speed reduction between the actuator 78 and the third gear 88. Other gear numbers and orientations are possible other than as shown to result in different speeds and torques.

The third gear 88 is in driving engagement with an actuating ring 90 of the roller and ramp assembly 82. More preferably, the actuating ring 90 has a set of teeth (not shown) on an outer radial surface that engages with a plurality of teeth on the third gear 88. The plurality of teeth of the actuating ring 90 is circumferentially extending about the actuating ring 90. The plurality of teeth of the actuating ring 90 may cover a full circumference of the actuating ring 90 or a portion of the circumference. A rotation of the third gear 88 causes the plurality of teeth of the actuating ring 90 to rotate, thus rotating the actuating ring 90.

The roller and ramp assembly 82 also comprises a pressure plate 92 and a plurality of rollers 94. The plurality of rollers 94 are disposed between the pressure plate 92 and the actuating ring 90. Alternatively, a cam disc actuator (not shown), which includes cooperative cam surfaces provided on opposite sides of an actuating ring and a pressure plate, may be used in place of the roller and ramp assembly 82.

The pressure plate 92 applies an axial force to a first axial thrust bearing 96 in order to load the clutch pack 70. The pressure plate 92 is non-rotatably mounted adjacent the first axial thrust bearing 96 but are capable of moving axially. An annular radial surface 98 of the pressure plate 92, which faces the actuating ring 90 is formed with a set of circumferentially extending grooves (not shown) of varying axial depth. The set of circumferentially extending grooves face complementary grooves (not shown) on an opposite annular surface 100 of the actuating ring 90. A depth of the set of circumferentially extending grooves in the opposite annular surface 100 varies in an opposite circumferential sense from the set of circumferentially extending grooves in the annular radial surface 98. A second axial thrust bearing 102 is mounted adjacent the actuating ring 90, to permit the actuating ring 90 to rotate when the roller and ramp assembly 82 is engaged.

The plurality of rollers 94 are one of spheres or elongate rollers. A number of rollers 94 correspond to a number of circumferentially extending grooves formed in each of the opposite annular surface 100 and the annular radial surface 98. The plurality of rollers 94 are disposed between the pressure plate 92 and the actuating ring 90, one in each pair of the circumferentially extending grooves.

It can be appreciated that when the actuator 78 moves the actuating ring 90 angularly relative to the pressure plate 92, the pressure plate 92 is driven axially. As a result, the pressure plate 92 frictionally loads the clutch pack 70. The axial movement of the pressure plate 92 is transmitted to the clutch pack 70 through the first axial thrust bearing 96. The first axial thrust bearing 96 is provided between the pressure plate 92 and the clutch pack 70 to allow for relative rotation and to reduce the friction there between.

A plurality of wave springs (not shown) may be positioned between each of the second plurality of clutch plates 66 to ensure the plates 66 are equally spaced in order to minimize the viscous drag torque between the clutch plates 52, 66. The wave springs also produce a preload to ensure seating of the axial thrust bearings 100, 102 and the roller and ramp assembly 82. A compression of the clutch plates 52, 66 in response to actuation of the roller and ramp assembly 82 causes the clutch plates 52, 66 to rotate together. A connection of the clutch can 48 to the clutch drum 58 through the clutch pack 70 rotates the second output shaft 56 to provide drive thereto, and thus a connected wheel (not shown) which is in driving engagement with the second output shaft 56.

Further, a bearing 104 is located between the actuating ring 90 and a housing 106. The housing 106 is fixed and partially encloses the roller and ramp assembly 82. The bearing 104, in addition to the second axial thrust bearing 102, permits the actuating ring 90 to rotate with respect to the housing 106.

The actuator 78, and thus an operation of the differential 10 and the torque coupling unit 12, is controlled by an electronic control unit 108 (schematically illustrated). Based on an evaluation of conditions according to at least one vehicle parameter, such as but not limited to, wheel speeds, the electronic control unit 108 engages the actuator 78 to place the roller and ramp assembly 82 in a degree of engagement, effecting variable torque transfer from the intermediate shaft 20 to the second output shaft 56 through the clutch pack 70. The differential 10 is thus provided with a limited slip function. When the actuator 78 is not actuated, the differential 10 operates in an open mode without the limited slip function. In the open mode, the pinion shaft 14 is drivingly disengaged, and no torque is distributed to the output shafts 18, 56 through the differential 10.

Figure 2:
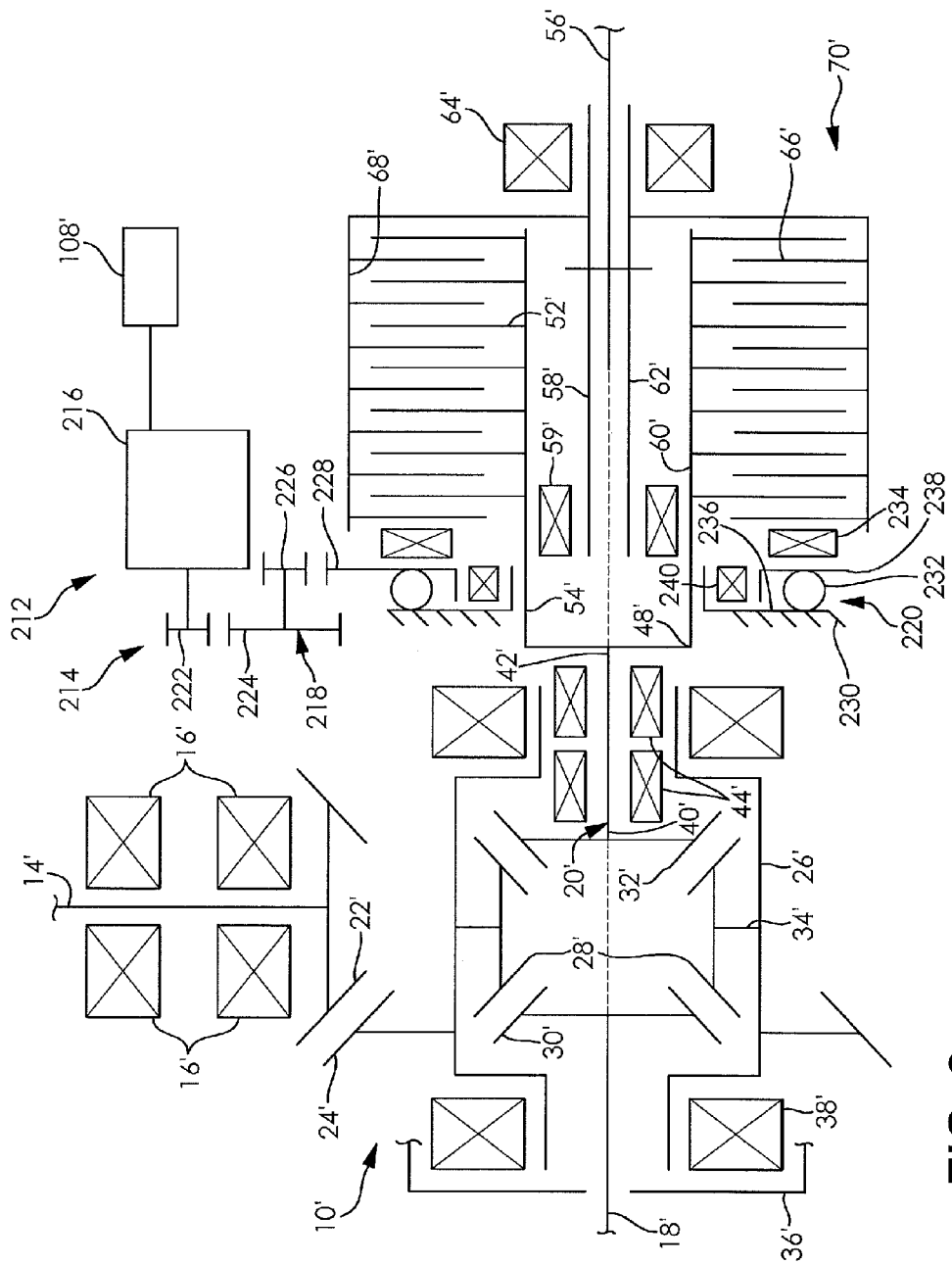
FIG. 2 is a schematic view of another embodiment of a differential and a torque coupling unit.

FIG. 2 illustrates a torque coupling unit 212 according to another embodiment of the invention. The embodiment shown in FIG. 2 includes similar components to the torque coupling unit 12 illustrated in FIG. 1. Similar structural features of the torque coupling unit 212 include the same reference numeral and a prime (') symbol, with the exception of the features described below.

The embodiment of the torque coupling unit 212 shown in FIG. 2 is similar to the torque coupling unit 12, with the exception of the use a clutch actuator assembly 214, which operated similarly to the clutch actuator assembly 76 illustrated in FIG. 1.

The clutch actuator assembly 214 is located adjacent the clutch pack 70'. The clutch actuator assembly 214 comprises an actuator 216, a gear set 218, and a roller and ramp assembly 220. The actuator 216 is in driving engagement with the gear set 218 and the gear set 218 is in driving engagement with the roller and ramp assembly 220.

The actuator 216 may be such as a reversible electric motor as it is compact and easily controllable. It will be appreciated that any other appropriate type of actuator may be used, such as hydraulic or pneumatic, and these are within the scope of the invention.

The actuator 216 drives the gear set 218, which may be a reduction set of gears. In the depicted embodiment, a first gear 222 of the actuator 216 drives a second gear 224 of the gear set 218. The second gear 224 drives a third gear 226 of the gear set 218. The gears 222, 224, 226 achieve a desired torque and speed reduction between the actuator 216 and the third gear 226. Other gear numbers and orientations are possible other than as shown to result in different speeds and torques.

The third gear 226 is in driving engagement with an actuating ring 228 of the roller and ramp assembly 220. More preferably, the actuating ring 228 has a set of teeth (not shown) on an outer radial surface that engages with a plurality of teeth on the third gear 226. The plurality of teeth of the actuating ring 228 is circumferentially extending about the actuating ring 228. The plurality of teeth of the actuating ring 228 may cover a full circumference of the actuating ring 228 or a portion of the circumference. A rotation of the third gear 226 causes the plurality of teeth of the actuating ring 228 to rotate, thus rotating the actuating ring 228.

The roller and ramp assembly 220 also comprises a pressure plate 230 and a plurality of rollers 232. The plurality of rollers 232 are disposed between the pressure plate 230 and the actuating ring 228. Alternatively, a cam disc actuator (not shown), which includes cooperative cam surfaces provided on opposite sides of an actuating ring and a pressure plate, may be used in place of the roller and ramp assembly 220.

The pressure plate 230 resists an axial force, which is applied to a first axial thrust bearing 234 by the actuating ring 228 in order to load the clutch pack 70'. The pressure plate 230 is non-rotatably mounted and spaced apart from the actuating ring 228. The pressure plate 230 may form a portion of a housing (not shown) associated with the torque coupling unit 212. An annular radial surface 236 of the pressure plate 230, which faces the actuating ring 228 is formed with a set of circumferentially extending grooves (not shown) of varying axial depth. The set of circumferentially extending grooves face complementary grooves (not shown) on an opposite annular surface 238 of the actuating ring 228. A depth of the set of circumferentially extending grooves in the opposite annular surface 238 varies in an opposite circumferential sense from the set of circumferentially extending grooves in the annular radial surface 236. The first axial thrust bearing 234, which is mounted adjacent the actuating ring 228, permits the actuating ring 228 to rotate when the roller and ramp assembly 220 is engaged.

The plurality of rollers 232 are one of spheres or elongate rollers. A number of rollers 232 correspond to a number of circumferentially extending grooves formed in each of the opposite annular surface 238 and the annular radial surface 236. The plurality of rollers 232 are disposed between the pressure plate 230 and the actuating ring 228, one in each pair of the circumferentially extending grooves.

It can be appreciated that when the actuator 216 moves the actuating ring 228 angularly relative to the pressure plate 230, the actuating ring 228 is driven axially. As a result, actuating ring 228 frictionally loads the clutch pack 70'. The axial movement of the actuating ring 228 is transmitted to the clutch pack 70' through the first axial thrust bearing 234. The first axial thrust bearing 234 is provided between the actuating ring 228 and the clutch pack 70' to allow for relative rotation and to reduce the friction there between.

Further, a bearing 240 is located between the actuating ring 228 and the pressure plate 230. The bearing 240, in addition to the first axial thrust bearing 234, permits the actuating ring 228 to rotate with respect to the pressure plate 230.

The actuator 216, and thus an operation of the differential 10' and the torque coupling unit 212, is controlled by an electronic control unit 108' (schematically illustrated). Based on an evaluation of conditions according to at least one vehicle parameter, such as but not limited to, wheel speeds, the electronic control unit 108' engages the actuator 216 to place the roller and ramp assembly 220 in a degree of engagement, effecting variable torque transfer from the intermediate shaft 20' to the second output shaft 56' through the clutch pack 70'. The differential 10' is thus provided with a limited slip function. When the actuator 216 is not actuated, the differential 10' operates in an open mode without the limited slip function. In the open mode, the pinion shaft 14' is drivingly disengaged, and no torque is distributed to the output shafts 18', 56' through the differential 10'.

It can be appreciated based on the foregoing that compared with FIG. 1, a bearing has been eliminated in the embodiment of the invention shown in FIG. 2. The removal of a bearing improves fuel economy because it reduces the number of rotating parts. The removal of the bearing also reduces the cost of the assembly.

Figure 3:
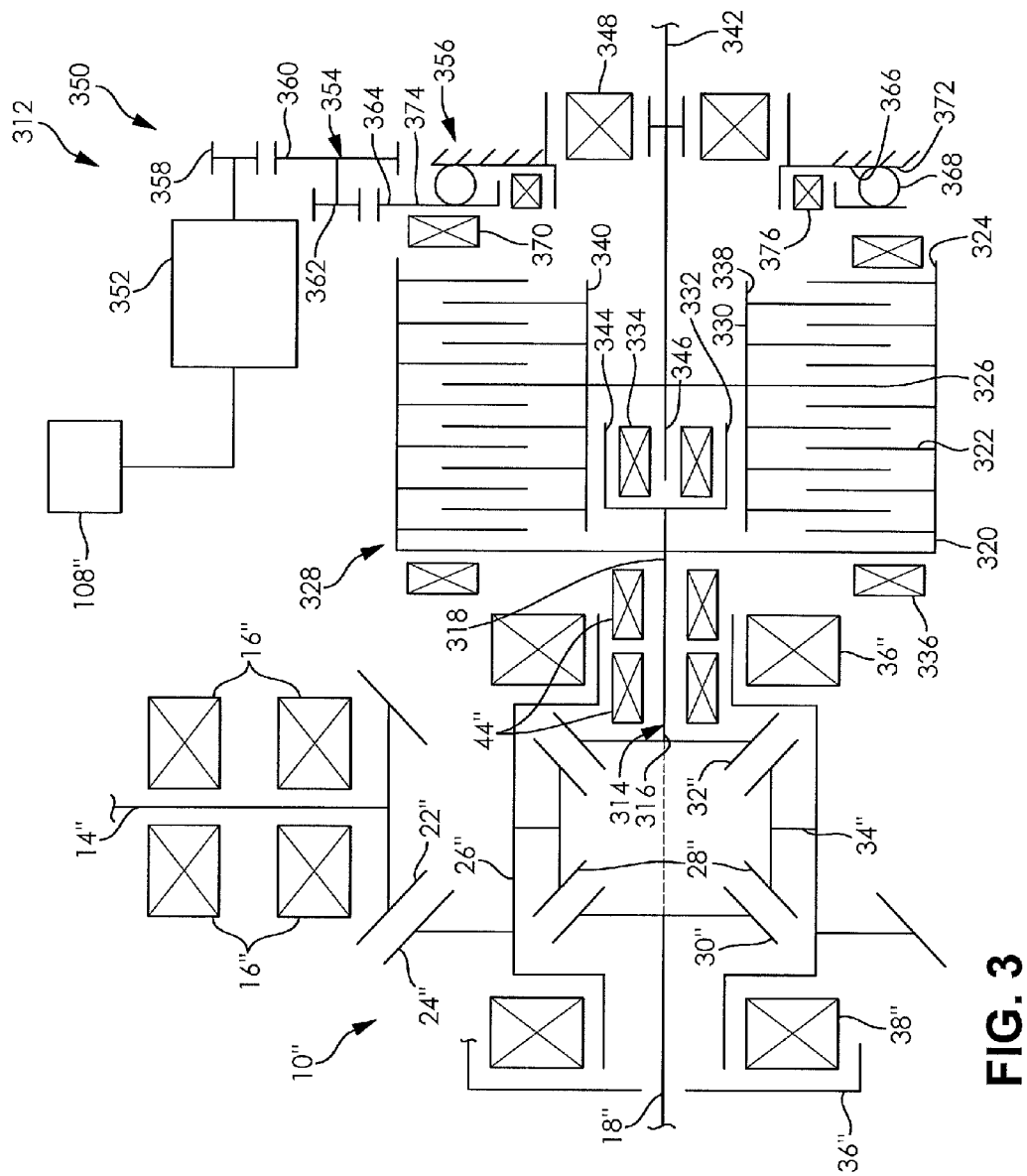
FIG. 3 is a schematic view of yet another embodiment of a differential and a torque coupling unit.

FIG. 3 illustrates a torque coupling unit 312 according to another embodiment of the invention. The embodiment shown in FIG. 3 includes similar components to the torque coupling unit 12 illustrated in FIG. 1. Similar structural features of the torque coupling unit 312 include the same reference numeral and a double prime (") symbol, with the exception of the features described below.

FIG. 3 illustrates a differential 10" and a torque coupling unit 312. The differential 10" is in driving engagement with a pinion shaft 14". The pinion shaft 14" is rotatably mounted in bearings 16" and is drivingly engaged with a source of rotational power, such as, but not limited to, an internal combustion engine. The differential 10" and the torque coupling unit 312 are respectively drivingly engaged with a first output shaft 18" and an intermediate shaft 314.

A differential case 26" houses a set of differential pinion gears 28", which are rotatably supported on a spider shaft 34" secured to the differential case 26". More particularly, the set of differential pinion gears 28" are located opposite one another on the spider shaft 34"; however, it is understood that the set of differential pinion gears 28" may have other arrangements. The differential pinion gears 28" engage a set of side gears 30", 32". The set of side gears 30", 32" comprise a first side gear 30" and a second side gears 32" adapted to rotate about an axis coincident with an axis of the shafts 18", 314. The differential case 26" is mounted for rotation within a differential housing 36" (partially illustrated). The differential case 26" is mounted on bearings 38" to facilitate rotation within the differential housing 36".

The first output shaft 18" and the intermediate shaft 314 are shown in FIG. 3 extending from the first side gear 30" and the second side gears 32", respectively. The intermediate shaft 314 has a first end portion 316 and a second end portion 318. The first end portion 316 has a set of splines (not shown) on an exterior surface (not shown) that fit within a central aperture (not shown) of the first side gear 30". The central aperture is defined by complimentary, internal splines (not shown). The first output shaft 18" thus turns with the first side gear 30". The intermediate shaft 314 is mounted for rotation within the differential housing 36" on bearings 44", which may be conventional or roller bearings.

The second end portion 318 of the intermediate shaft 314 is connected to a clutch drum 320. Thus, the clutch drum 320 rotates with the intermediate shaft 314. The clutch drum 320 and the intermediate shaft 314 may be integrally formed and unitary with one another or they may be separately formed. If separately formed, the intermediate shaft 314 may be connected to the clutch drum 320 by a plurality of fasteners, splines, or the like.

The clutch drum 320 houses a first plurality of clutch plates 322 that are located on an internal surface 324 of the clutch drum 320. The first plurality of clutch plates 322 are secured to the internal surface 324. The first plurality of clutch plates 322 are attached to the internal surface 324 and do not separate therefrom during operation, but the first plurality of clutch plates 322 are permitted to move axially along the internal surface 324. The first plurality of clutch plates 322 are interleaved with a second plurality of clutch plates 326, which are secured to a clutch can 330. Together, the interleaved clutch plates 322, 326 form a clutch pack 328. A support portion 332 within the clutch drum 320 extends in an axial manner and receives a second output shaft bearing 334. The support portion 332 is rotationally connected to the intermediate shaft 314. More particularly, the support portion 332 is directly rotationally connected to the second end portion 318 of the intermediate shaft 314.

A first axial thrust bearing 336 is provided between a portion of a housing (not shown) and the clutch drum 320 to allow for relative rotation and to reduce the friction there between. The housing may be a portion of the differential housing 36" or another fixed housing.

The clutch can 330 is a hollow, cylindrically shaped member which is at least partially disposed within the clutch drum 320. An outer surface 338 of the clutch can 330 has located thereon the second plurality of clutch plates 326, which are secured thereto. The second plurality of clutch plates 326 are attached to the clutch can 330 and cannot separate therefrom during operation, but the second plurality of clutch plates 326 are permitted to move axially along the outer surface 338 of the clutch can 330.

An interior 340 of the clutch can 330 houses a second output shaft 342. The second output shaft 342 is mounted for rotation within the clutch can 330 on the second output shaft bearing 334. More particularly, the second output shaft bearing 334 is located between an internal surface 344 of the support portion 332 and an outer surface 346 of the second output shaft 342. The second output shaft 342 is also mounted on a second bearing 348 located outboard from the second output shaft bearing 334. The second output shaft bearing 334 and the second bearing 348 facilitate rotation of the second output shaft 342 and the clutch can 330. The second output shaft 342 has a set of splines (not shown) on an exterior surface (not shown) that fit within a central aperture (not shown) of the clutch can 330. The central aperture is defined by complimentary, internal splines (not shown). The second output shaft 342 thus turns with the clutch can 330.

A clutch actuator assembly 350 is located adjacent the clutch pack 328. The clutch actuator assembly 350 comprises an actuator 352, a gear set 354, and a roller and ramp assembly 356. The actuator 352 is in driving engagement with the gear set 354 and the gear set 354 is in driving engagement with the roller and ramp assembly 356.

The actuator 352 may be such as a reversible electric motor as it is compact and easily controllable. It will be appreciated that any other appropriate type of actuator may be used, such as hydraulic or pneumatic, and these are within the scope of the invention.

The actuator 352 drives the gear set 354, which may be a reduction set of gears. In the depicted embodiment, a first gear 358 of the actuator 352 drives a second gear 360 of the gear set 354. The second gear 360 drives a third gear 362 of the gear set 354. The gears 358, 360, 362 achieve a desired torque and speed reduction between the actuator 352 and the third gear 362. Other gear numbers and orientations are possible other than as shown to result in different speeds and torques.

The third gear 362 is in driving engagement with an actuating ring 364 of the roller and ramp assembly 356. More preferably, the actuating ring 364 has a set of teeth (not shown) on an outer radial surface that engages with a plurality of teeth on the third gear 362. The plurality of teeth of the actuating ring 364 is circumferentially extending about the actuating ring 364. The plurality of teeth of the actuating ring 364 may cover a full circumference of the actuating ring 364 or a portion of the circumference. A rotation of the third gear 362 causes the plurality of teeth of the actuating ring 364 to rotate, thus rotating the actuating ring 364.

The roller and ramp assembly 356 also comprises a pressure plate 366 and a plurality of rollers 368. The plurality of rollers 368 are disposed between the pressure plate 366 and the actuating ring 364. Alternatively, a cam disc actuator (not shown), which includes cooperative cam surfaces provided on opposite sides of an actuating ring and a pressure plate, may be used in place of the roller and ramp assembly 356.

The pressure plate 366 resists an axial force, which is applied to a second axial thrust bearing 370 by the actuating ring 364 in order to load the clutch pack 70". The pressure plate 366 is non-rotatably mounted and spaced apart from the actuating ring 364. The pressure plate 366 may form a portion of a housing (not shown) associated with the torque coupling unit 312. An annular radial surface 372 of the pressure plate 366, which faces the actuating ring 364 is formed with a set of circumferentially extending grooves (not shown) of varying axial depth. The set of circumferentially extending grooves face complementary grooves (not shown) on an opposite annular surface 374 of the actuating ring 364. A depth of the set of circumferentially extending grooves in the opposite annular surface 374 varies in an opposite circumferential sense from the set of circumferentially extending grooves in the annular radial surface 372.

The second axial thrust bearing 370, which is mounted adjacent the actuating ring 364, permits the actuating ring 364 to rotate when the roller and ramp assembly 356 is engaged.

The plurality of rollers 368 are one of spheres or elongate rollers. A number of rollers 368 correspond to a number of circumferentially extending grooves formed in each of the opposite annular surface 374 and the annular radial surface 372. The plurality of rollers 368 are disposed between the pressure plate 366 and the actuating ring 364, one in each pair of the circumferentially extending grooves.

It can be appreciated that when the actuator 352 moves the actuating ring 364 angularly relative to the pressure plate 366, the actuating ring 364 is driven axially. As a result, actuating ring 364 frictionally loads the clutch pack 70". The axial movement of the actuating ring 364 is transmitted to the clutch pack 70" through the second axial thrust bearing 370. The second axial thrust bearing 370 is provided between the actuating ring 364 and the clutch pack 70" to allow for relative rotation and to reduce the friction there between.

Further, a bearing 376 is located between the actuating ring 364 and the pressure plate 366. The bearing 376, in addition to the second axial thrust bearing 370, permits the actuating ring 364 to rotate with respect to the pressure plate 366. As shown in FIG. 3, the bearing 376 is located radially inboard of the rollers 368 of the roller and ramp assembly 356.

The actuator 352, and thus an operation of the differential 10" and the torque coupling unit 312, is controlled by an electronic control unit 108" (schematically illustrated). Based on an evaluation of conditions according to at least one vehicle parameter, such as but not limited to, wheel speeds, the electronic control unit 108" engages the actuator 352 to place the roller and ramp assembly 356 in a degree of engagement, effecting variable torque transfer from the intermediate shaft 314 to the second output shaft 342 through the clutch pack 70". The differential 10" is thus provided with a limited slip function. When the actuator 352 is not actuated, the differential 10" operates in an open mode without the limited slip function. In the open mode, the pinion shaft 14" is drivingly disengaged, and no torque is distributed to the output shafts 18", 342 through the differential 10".

A plurality of wave springs (not shown) may be positioned between each of the first plurality of clutch plates 322 to ensure the plates 322 are equally spaced in order to minimize the viscous drag torque between the clutch plates 322, 326. The wave springs also produce a preload to ensure seating of the axial thrust bearings 336, 370 and the roller and ramp assembly 356. A compression of the clutch plates 322, 326 in response to actuation of the roller and ramp assembly 356 causes the clutch plates 322, 326 to rotate together. A connection of the clutch drum 320 to the clutch can 330 through the clutch pack 328 rotates the second output shaft 342 to provide drive thereto, and thus a connected wheel (not shown) which is in driving engagement with the second output shaft 342.

It can be appreciated based on the foregoing that compared with FIG. 1, a bearing has been eliminated in the embodiment of the invention shown in FIG. 3. The removal of a bearing improves fuel economy because it reduces the number of rotating parts. The removal of the bearing also reduces the cost of the assembly.

In accordance with the provisions of the patent statutes, the present invention has been described in what is considered to represent its preferred embodiments, however, it should be noted that the invention can be practiced otherwise than as specifically illustrated and described without departing from its scope or spirit.

What is claimed is:

1. A torque coupling unit for use with a differential assembly, the torque coupling unit comprising:
a first member in driving engagement with a side gear of the differential assembly;
a second member in driving engagement with an output shaft;
a clutching assembly comprising a first portion and a second portion, the first portion drivingly engaged with the first member and the second portion drivingly engaged with the second member;
a clutch actuator assembly disposed adjacent the clutching assembly, the clutch actuator assembly comprising an actuating ring, a fixed, nonrotatable pressure plate and a thrust bearing between the actuating ring and the clutching assembly, wherein in response to a rotation of a portion of the clutch actuator assembly said thrust bearing is driven in an axial manner by the actuating ring into direct contact with the clutching assembly, causing the first portion of the clutching assembly to be at least variably frictionally engaged with the second portion of the clutching assembly;
wherein a non-thrust bearing is located between the actuating ring and the pressure plate to facilitate rotation of the actuating ring with respect to the pressure plate, the non-thrust bearing located radially inboard from a plurality of rollers located between said actuating ring and said pressure plate; and
wherein an outer surface of said output shaft is rotatably mounted within a first bearing, said first bearing mounted on an internal surface of a support portion, said support portion located within said clutching assembly first portion and said second portion.

2. The torque coupling unit of claim 1, wherein the first member comprises a clutch can and the second member is a clutch drum, the clutch can at least partially disposed in the clutch drum.

3. The torque coupling unit of claim 2, further comprising a second bearing disposed adjacent the clutch drum, the second bearing rotatably supporting the clutch drum.

4. The torque coupling unit of claim 2, wherein the non-thrust bearing and the clutch actuator assembly are radially arranged from the output shaft.

5. The torque coupling unit of claim 2, wherein the output shaft is at least partially disposed within the clutch drum and the clutch can.

6. The torque coupling unit of claim 2, wherein the first member further comprises an intermediate shaft in driving engagement with the side gear and the clutch can, the intermediate shaft mounted for rotation within a differential housing.

7. The torque coupling unit of claim 2, wherein the clutch can receives the first bearing in the support portion for supporting the output shaft.

8. The torque coupling unit of claim 1, wherein the clutch actuator assembly further comprises an actuator and a gear set, the gear set in driving engagement with the actuator of said clutch actuator assembly and said actuator ring.

9. The torque coupling unit of claim 8, wherein the gear set reduces a speed between the actuator of said clutch actuator assembly and said actuator ring.

10. The torque coupling unit of claim 8, wherein said clutch actuator assembly further comprises a roller and ramp assembly, wherein said roller and ramp assembly comprises said actuating ring, said pressure plate, and said plurality of rollers, the actuating ring disposed against said non-thrust bearing and in driving engagement with the actuator of said clutch actuator assembly through the gear set, the pressure plate non-rotatably disposed against a housing of the torque coupling unit, and the plurality of rollers disposed between the actuating ring and the pressure plate.

11. A torque coupling unit for use with a differential assembly, the torque coupling unit comprising:
a first member in driving engagement with a side gear of the differential assembly;
a second member in driving engagement with an output shaft;
a clutching assembly comprising a first portion and a second portion, the first portion drivingly engaged with the first member and the second portion drivingly engaged with the second member; and
a clutch actuator assembly disposed adjacent the clutching assembly, the clutch actuator assembly comprising an actuating ring, a fixed, nonrotatable pressure plate and a thrust bearing between the actuating ring and the clutching assembly, wherein in response to a rotation of a portion of the clutch actuator assembly said thrust bearing is driven in an axial manner by the actuating ring into direct contact with the clutching assembly, causing the first portion of the clutching assembly to be at least variably frictionally engaged with the second portion of the clutching assembly;
wherein an outer surface of said output shaft is rotatably mounted within a bearing, said bearing mounted on an internal surface of a support portion, said support portion rotationally connected to said first member, said support portion located within said clutching assembly first portion and said second portion.

12. The torque coupling unit of claim 11, further comprising a second thrust bearing, wherein said second thrust bearing is located between said first member and a housing.

13. The torque coupling unit of claim 11, further comprising a non-thrust bearing, wherein said non-thrust bearing is located between the actuating ring and the pressure plate to facilitate rotation of the actuating ring with respect to the pressure plate.

14. The torque coupling unit of claim 11, wherein the clutch actuator assembly further comprises an actuator and a gear set, the gear set in driving engagement with the actuator of said clutch actuator assembly and said actuator ring.

15. The torque coupling unit of claim 14, wherein the gear set reduces a speed between the actuator of said clutch actuator assembly and said actuator ring.

16. The torque coupling unit of claim 14, wherein said clutch actuator assembly further comprises a roller and ramp assembly, wherein said roller and ramp assembly comprises said actuating ring, said pressure plate, and said plurality of rollers, the actuating ring disposed against said non-thrust bearing and in driving engagement with the actuator of said clutch actuator assembly through the gear set, the pressure plate non-rotatably disposed against a housing of the torque coupling unit, and the plurality of rollers disposed between the actuating ring and the pressure plate.

* * * * *